Feb. 26, 1957 W. J. CALDWELL 2,782,664
DEVICE FOR STRIPPING INSULATION FROM WIRES
Filed Aug. 29, 1952 7 Sheets-Sheet 1

INVENTOR.
Washington J. Caldwell
BY
Falvey, Souther & Stoltenberg

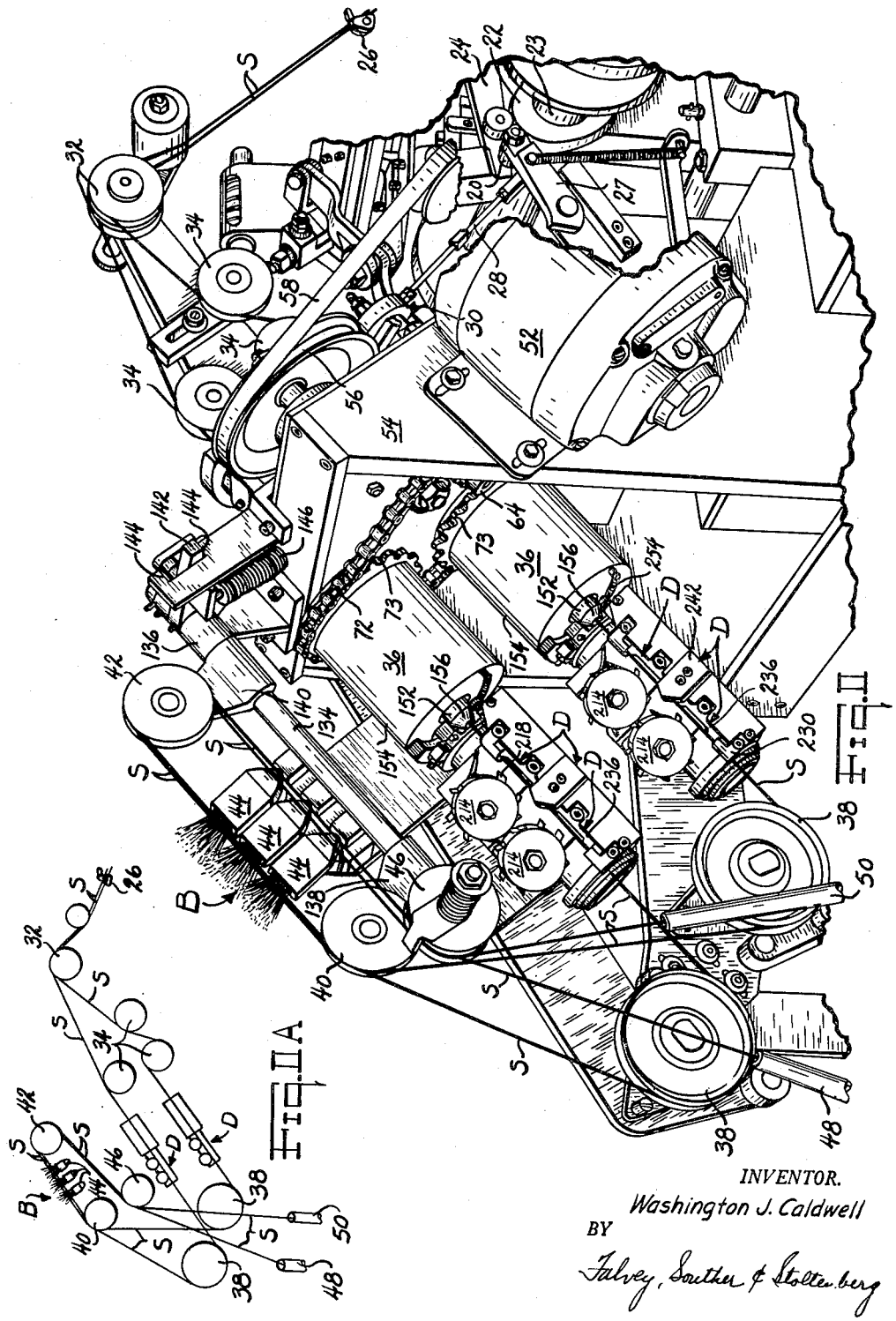

Feb. 26, 1957 W. J. CALDWELL 2,782,664
DEVICE FOR STRIPPING INSULATION FROM WIRES
Filed Aug. 29, 1952 7 Sheets-Sheet 3
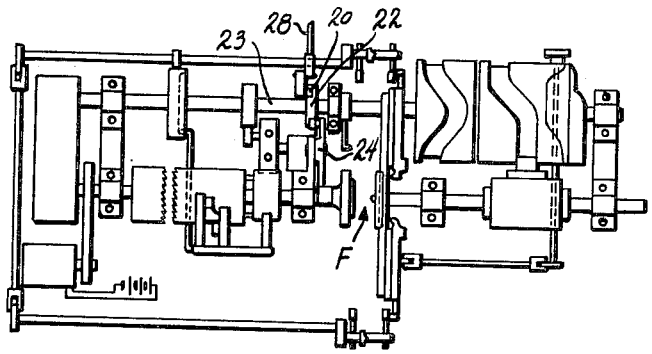
Fig. III
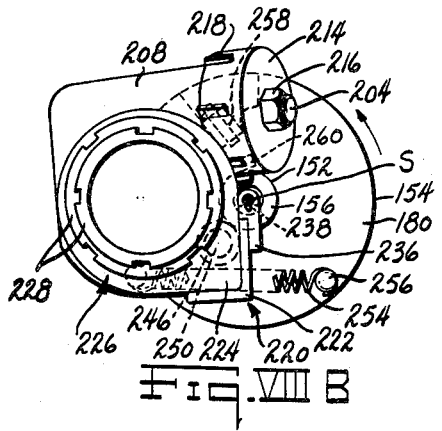
Fig. VIII B
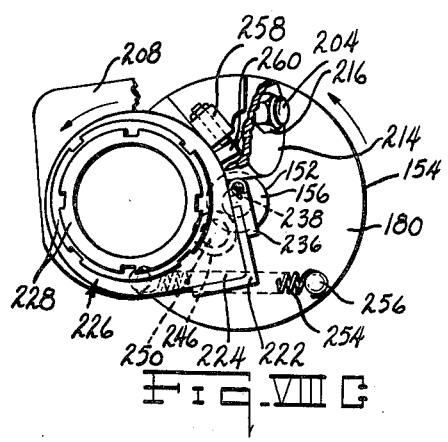
Fig. VIII C
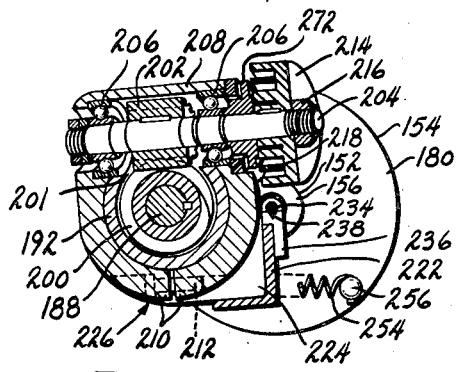
Fig. VIII A
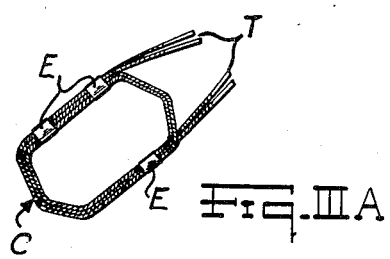
Fig. III A
INVENTOR.
Washington J. Caldwell
BY
Falvey, Souther & Stoltenberg Feb. 26, 1957 W. J. CALDWELL 2,782,664
DEVICE FOR STRIPPING INSULATION FROM WIRES
Filed Aug. 29, 1952 7 Sheets-Sheet 4
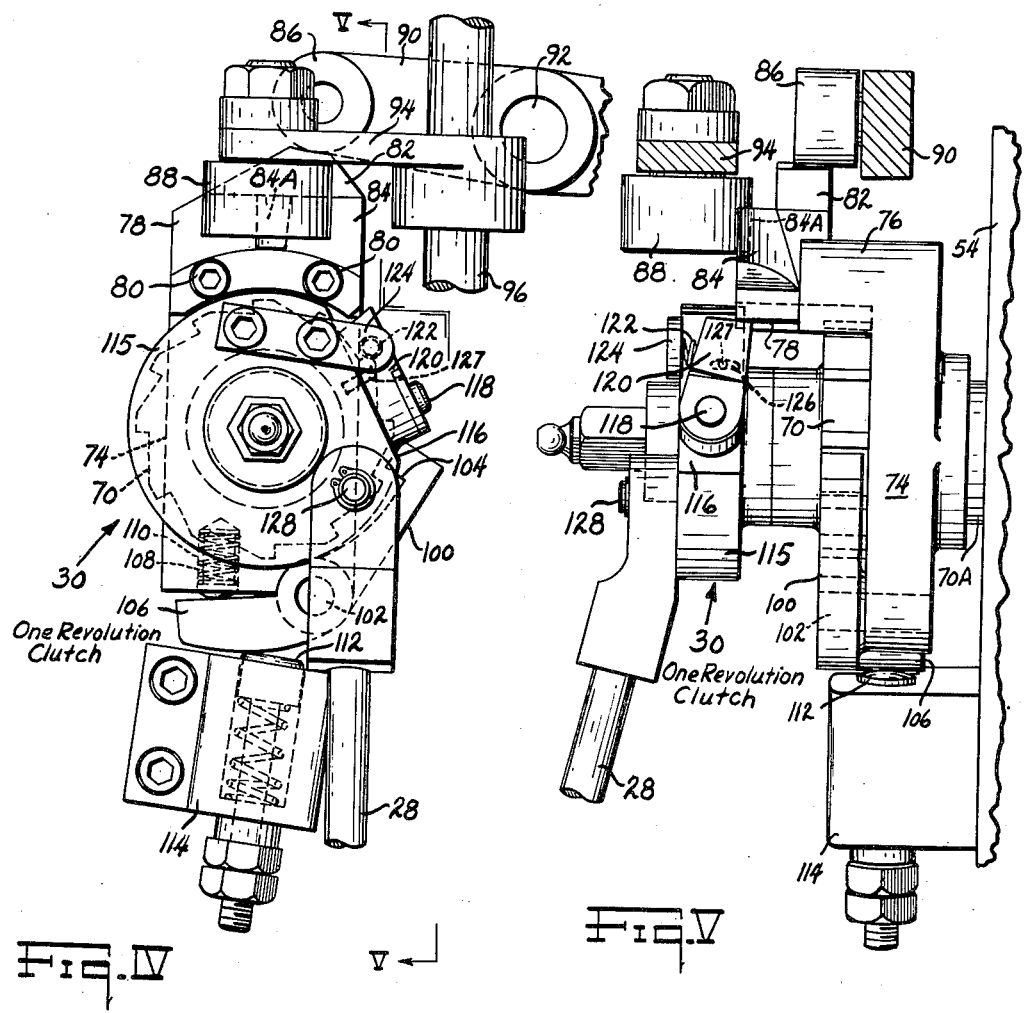
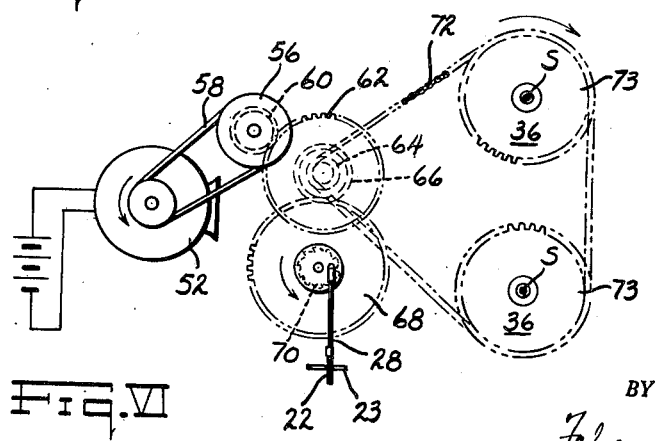
INVENTOR.
Washington J. Caldwell
BY
Falvey, Souther & Stoltenberg

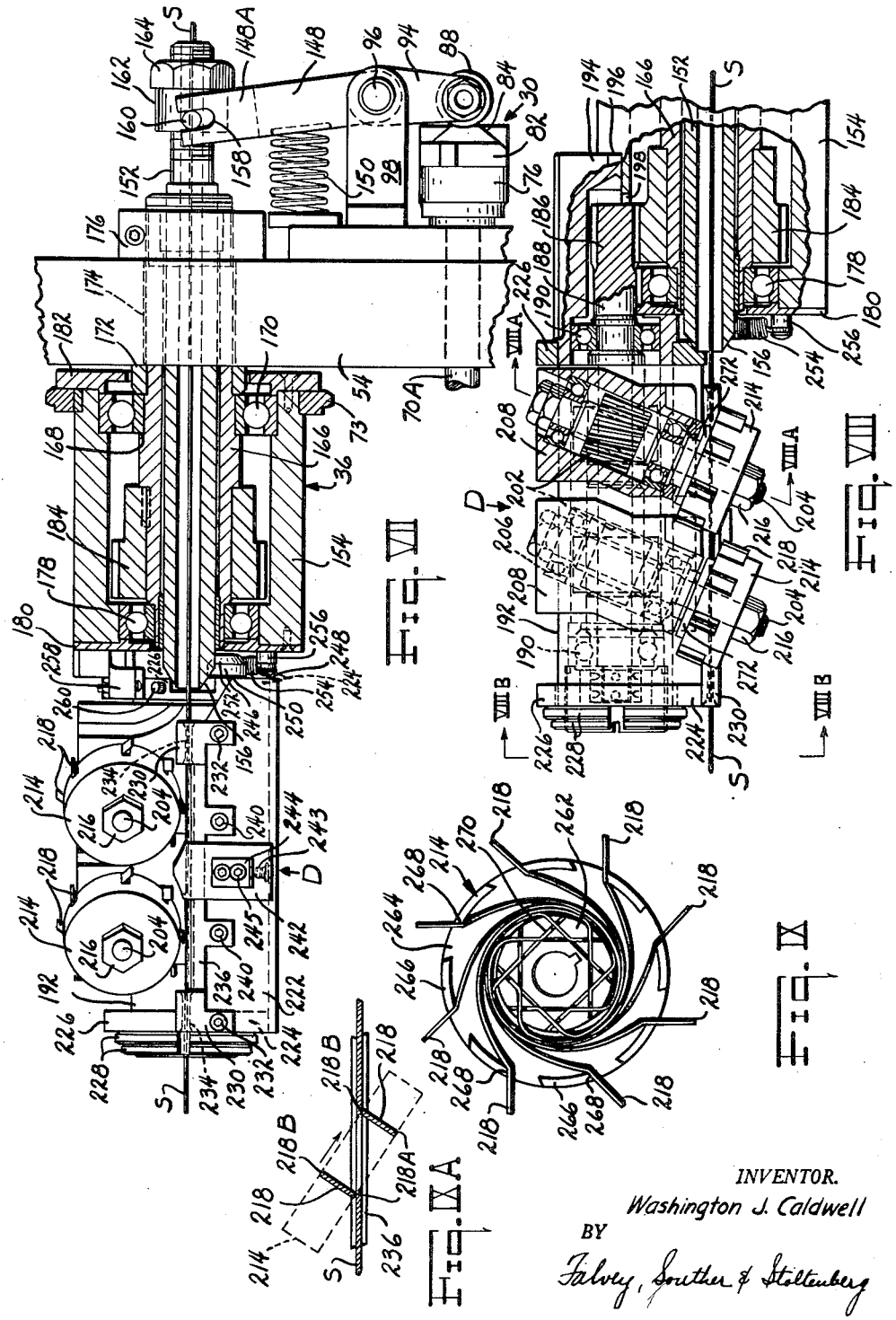

Feb. 26, 1957 W. J. CALDWELL 2,782,664
DEVICE FOR STRIPPING INSULATION FROM WIRES
Filed Aug. 29, 1952 7 Sheets-Sheet 6
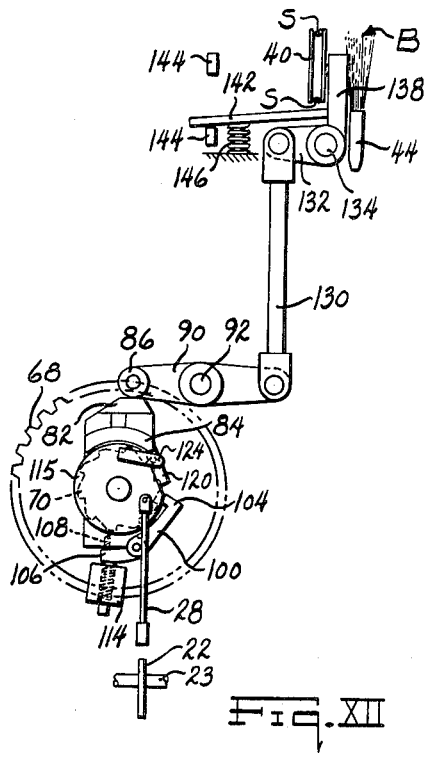
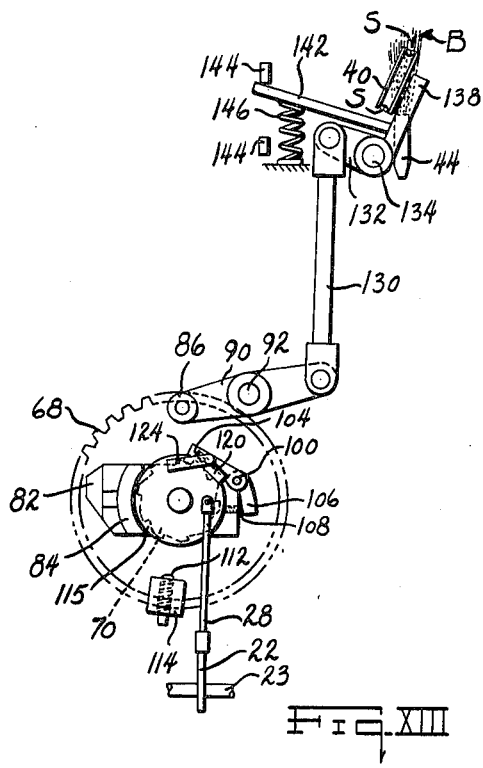
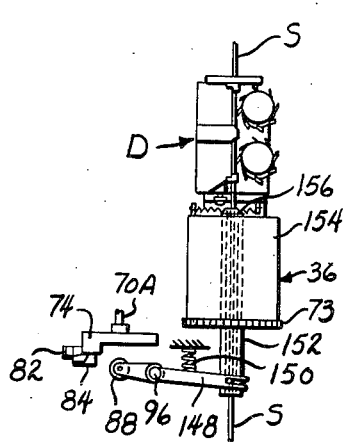
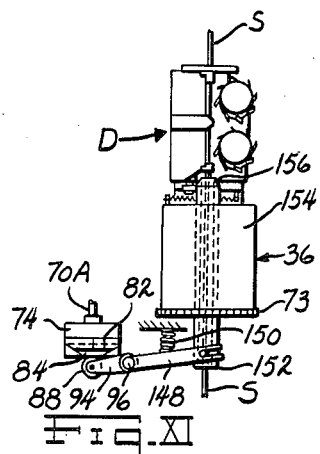
INVENTOR.
Washington J. Caldwell
BY
Falvey, Souther & Stoltenberg

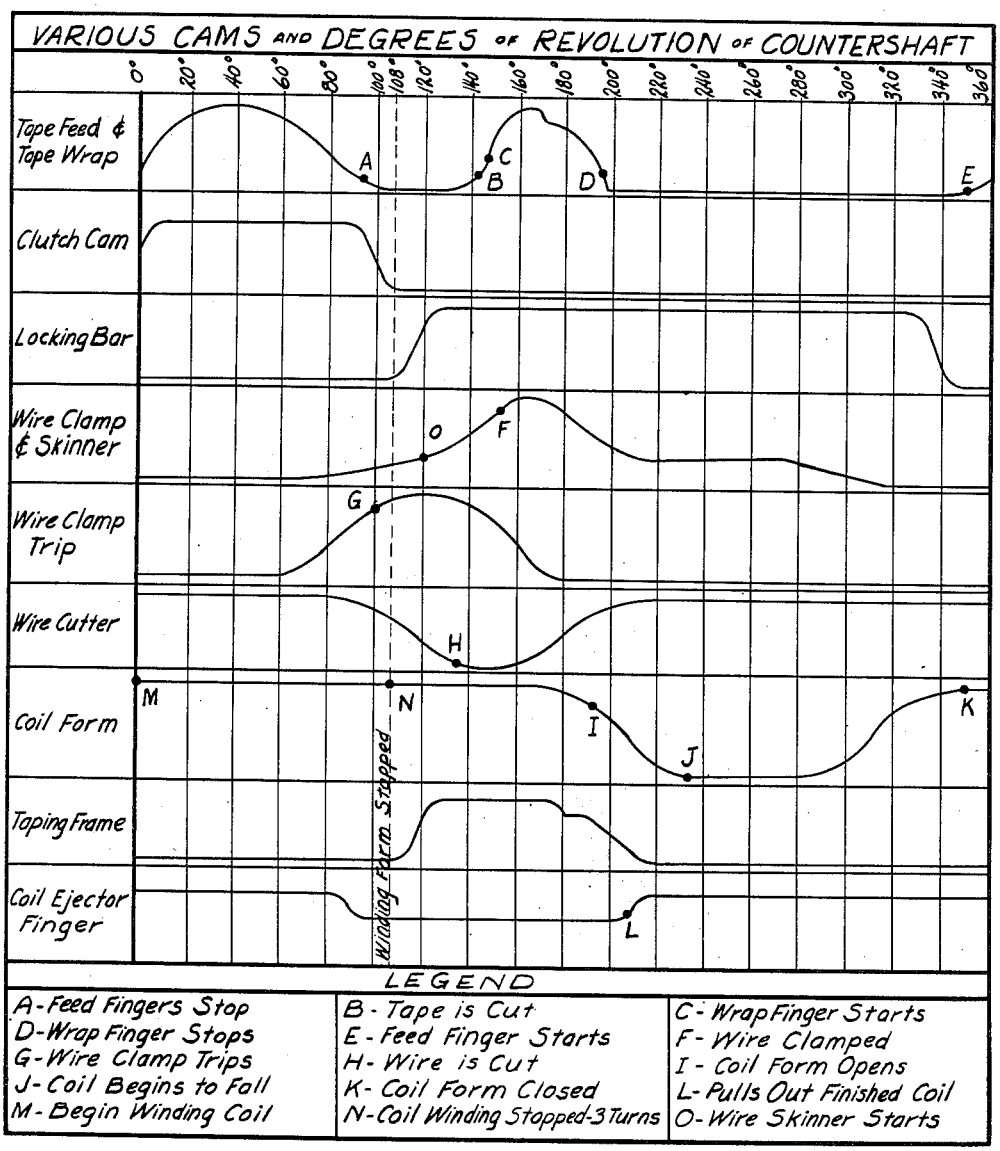
Fig. XIV

United States Patent Office 2,782,664
Patented Feb. 26, 1957

2,782,664

DEVICE FOR STRIPPING INSULATION FROM WIRES

Washington J. Caldwell, Toledo, Ohio

Application August 29, 1952, Serial No. 307,105

6 Claims. (Cl. 81—9.51)

This invention relates to coil winding machines, more particularly to coil winding machines wherein the coil is wound automatically from insulated strands of wire which have had the insulation removed from them at predetermined locations in the machine, so that when the coil is completely wound and ejected from the machine, the terminating ends of the coil are bare and ready for assembly into electrical instrumentalities wherein the bare terminating ends of the coil are to be soldered or otherwise connected permanently into an electric circuit.

The invention contemplates the provision of a method of and a machine for stripping insulation at selected locations from continuous wire strands prior to the strands being wound into a winding form to the predetermined coil shape, the insulation being stripped at such points from the continuous strands so that the trailing end of the just wound coil and the leading end of the coil to be wound are formed by cutting the strands at approximately the mid-point of the bare section of the wire strand from which the insulation has been stripped. The completed coil is thereby issued from the winding machine with the insulation cleaned from both ends of the coil, so that the coil may be positioned without further operations directly into the electrical instrumentality such as an automotive generator.

It is, therefore, a principal object of this invention to provide a method of and machine for stripping insulation from the free ends of a coil as it is being wound in a form in a winding machine.

It is a further object to provide a machine which strips insulation from continuous strands of wire at predetermined points before the strands are fed into a winding machine to be formed into a coil for use in an electrical instrumentality.

It is a further object of this invention to provide a machine which strips insulation from continuous strands of wire before it is fed into a winding machine at predetermined positions on the strands, so that when the wound coil is severed from the strand, the cut will occur midway of a stripped and bare wire portion whereby the trailing end of the coil just wound and the leading end of the next coil to be wound are cleansed of insulation and made bare.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 2 is an elevational side view in perspective of the machine;

Fig. 2A is a schematic view showing the movement of the wire strands through the elements of the machine;

Fig. 3 is a plan view of the machine shown in application Serial No. 144,785 showing the driving relations thereof and the point at which the cooperative relation thereto of the present invention is applied;

Fig. 3A is a perspective view of a coil as wound by the machine shown in Fig. 3 with tape holding elements applied;

Fig. 4 is an elevational view of a detail showing the driving relation of the present invention as related to the machine shown in Fig. 3;

Fig. 5 is a side elevational view of Fig. 4;

Fig. 6 is a diagrammatic view of the secondary driving members of the wire stripping device;

Fig. 7 is a plan view, partly in section, of the wire stripper;

Fig. 8 is an elevational view of the wire stripper shown in Fig. 7;

Fig. 8A is a sectional view taken along line 8A—8A of Fig. 8;

Figs. 8B and 8C are elevational views taken from 8B—8B of Fig. 8, and show two operational positions taken by the wire stripping mechanism;

Fig. 9 is a plan view of the rotatable cutter of the wire stripper;

Fig. 9A is a plan view, partly in section, of the relation between the insulation scraper and the strand;

Fig. 10 is a diagrammatic view of the control for the wire stripper showing the scraper in contact with the wire;

Fig. 11 is also a diagrammatic view of the control for the wire stripper showing the scraper in free position with reference to the wire;

Fig. 12 is a plan view of the control for the burner with the wire clear of the flame;

Fig. 13 is a plan view similar to Fig. 12 with the control for the burner in contact position with the wire in the flame;

Fig. 14 is a diagram of controls related to the machine shown in Fig. 3.

Figure 1:
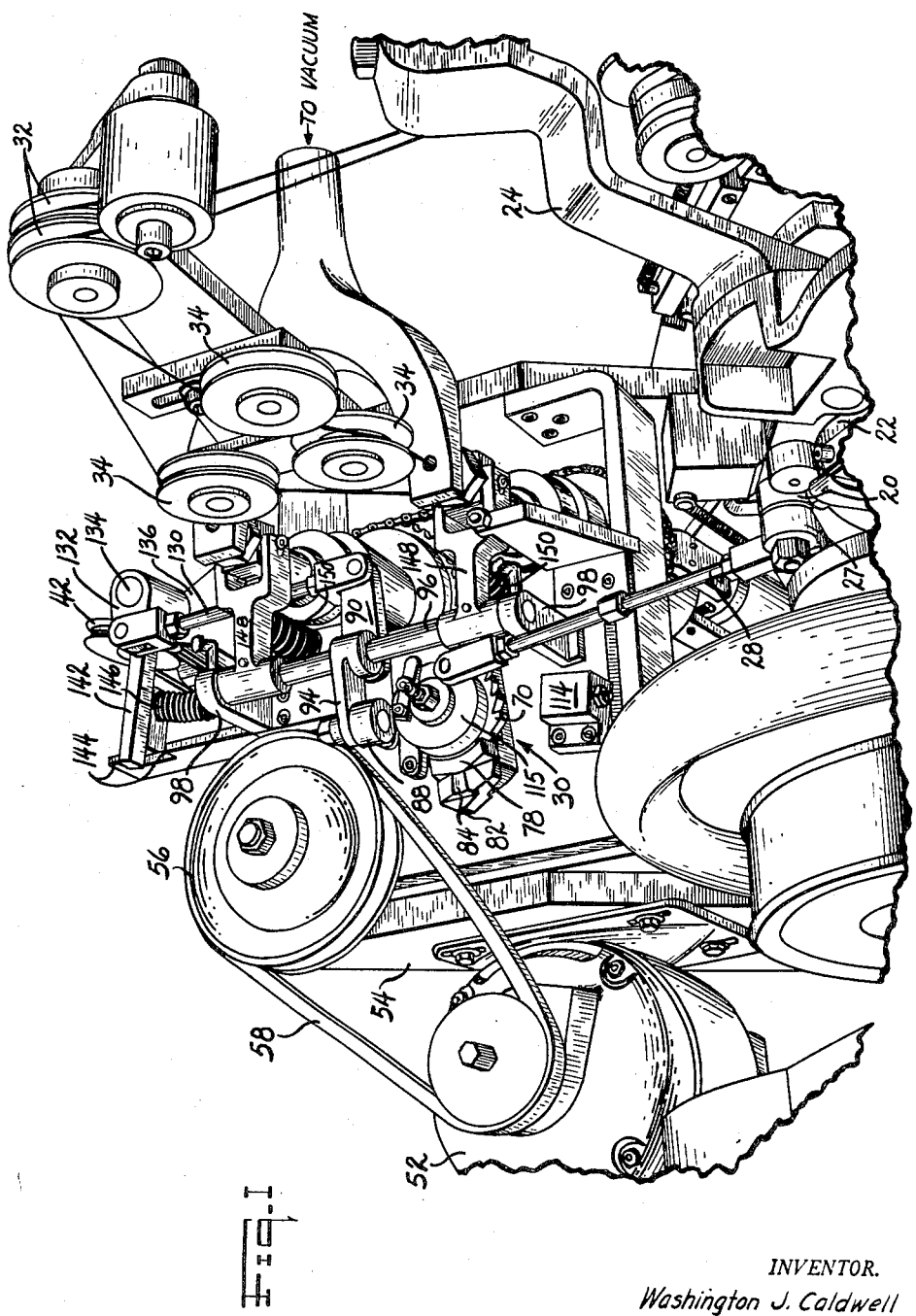
Fig. 1 is an elevational front view in perspective of a machine incorporating the invention.

The invention disclosed herein relating to methods of winding armature coils for automotive generators and machines incorporating such methods, is an improvement of the method and machine disclosed in Patent No. 2,154,792, issued to Karl H. Weber on April 18, 1939, and to the method and machine disclosed in application Serial No. 144,785, filed by Washington J. Caldwell, on February 17, 1950, now Patent No. 2,705,978. The invention, however, is capable of being revised and adapted for use in other methods and machines, than that referred to above, to which the invention has been applied as an accessory and is disclosed therewith for purposes of clarity and ease of understanding the nature of the invention.

The basic machine to which this invention has been applied is disclosed in Patent No. 2,154,792 which was subsequently improved by the application of a taping device which issued from the machine finished coils having applied to the coil sides small elements of tape in the nature of holding means, all as disclosed in application Serial No. 144,785. The present invention is also applied to the basic machine for the purpose of stripping the insulation from the coil ends to prepare the coils for use in electrical instrumentalities in which the coils are connected permanently in an electric circuit by soldering or the like. The bare ends of the coils, as issued by the machine incorporating the present invention, are suitable for immediate use without a special operation as has been necessary in the past.

Referring now to the drawings, particularly to Figs. 1, 2, 3, and 3A, the invention is shown as applied to a coil winding machine disclosed in the Caldwell application mentioned hereinbefore as an accessory. In Fig.

3A, the completed coil C as issuing from the machine is shown including the terminal portions T from which the insulation has been stripped by the device to be described hereinafter. The coil is otherwise substantially the same as that issuing from the machine described in the Caldwell application, which performs the winding and severing steps as well as that step in which the tape elements E are automatically applied to the active coil sides before it is ejected from the winding machine. Previously, the insulation was stripped from the terminals T by a manual operation by a scratch brush, which is obviated by the addition of the present accessory which performs this step before the strands are wound into the winding form.

In Fig. 3, a plan view is shown of the machine disclosed in the aforementioned application showing the salient features thereof including the separable winding form F and the mechanism required to operate the device automatically to wind the wire strands into a completed coil as shown in Fig. 3. Inasmuch as this machine is fully described and disclosed in said application, reference is hereby made thereto for a clear understanding thereof. In order to establish the necessary timed relation between the winding and taping machine for the basic coil, and the insulation stripping device about to be described, a cam roller 20 is provided to be actuated by the same cam 22 mounted on the rotating countershaft 23 which actuates the arm 24 controlling the wire gripper 26 (Fig. 2) for the free end of the strand. The roller 20 is actuated in advance of the arm 24 as will again be described in this specification hereinafter. The cam roller is mounted on a pivoted arm 27, to which is pivoted a pitman 28 extending upwardly to actuate a one revolution clutch 30 controlling the action of the wire stripping device in timed relation to the action of the main coil winding machine to attain the results set forth in relation to the wound coil C.

Referring now specifically to Fig. 2, the wire gripper 26 automatically grips the free ends of the wire strands S, which are severed below the gripper to free the just wound coil in the winding form F from the strands to allow it to be ejected from the machine. From the gripper 26, the wire strands S extend back over sheaves 32 which determine the main winding plane, thence over guide sheaves 34 (Fig. 1) into the wire stripper elements 36 to a second definitive position point D, where the insulation is actually scraped from the strands. The actual distance, as measured along the strands S, between the end of the wire and the gripper 26 and the mid point of position D, is the same as that length of strand which is to be wound into the next coil. The gripper 26 grips the strands S at a point adjacent the mid point sections from which the insulation has already been stripped, so that both the trailing end of the coil just wound, and the leading end of the coil about to be wound will both be free of insulation. The zone of the strands S from which the insulation is stripped at point D is sufficiently long to attain these results, with some leeway being allowed for manufacturing tolerances.

From the insulating scraping position D, the strands S proceed back over and around (1⅓ turns) a set of tension sheaves 38 (Fig. 2) thence upwardly over a pair of spaced laterally movable sheaves 40 and 42, the strands being here closely spaced together to proceed at selected times over burners 44 to establish a third definitive position, viz, point B where the insulation is burnt from the wire strands S when moved thereover by mechanisms to be described hereinafter. The distances between point D and point B, as measured along the strand, must be the same as the distances from point D to the end of the strand in the strand gripper 26, in order that the insulation on the strands may first be subjected to a burning operation (point B), then proceed to the insulation scraping operation (point D) and then proceed to the gripper 26 from which the strands are wound into the completed coil with both leading and trailing terminals T free of insulation. The strands S are pulled from one point to the next by the rotation of the winding form.

From the sheave 42, the strands proceed back over guide sheaves 46 which also provide tension into tubes 48 and 50 which lead to storage reels (not shown). This gives a broad outline of the method used in scraping the insulation from the terminal ends of the coils C. The mechanisms whereby this method is embodied in a successful machine will now be described.

The power for driving the mechanisms of the wire insulation stripper is derived from an electric motor 52 mounted on the side of a box-like frame 54 in any convenient manner, which is connected by a belt drive to a gear reduction, mounted on the interior of the frame. These driving arrangements are shown in Fig. 6, where the motor 52 drives pulley 56 by belt 58 which then drives a pinion 60 meshed with a larger gear 62 to provide a speed reduction. Gear 62 drives a sprocket 64 and a second pinion 66 meshing with a larger gear 68 driving a ratchet wheel 70 of the one-revolution clutch 30 already mentioned with reference to the timing device related back to the main coil winding machine. The sprocket 64 meshes with a chain 72 which drives sprockets 73 attached to the wire strippers 36 as is best seen in Fig. 2. By these driving arrangements, the motor 52 constantly rotates the ratchet wheel 70 of the one-revolution clutch 30, which is capable of being tripped by the pitman 28 in timed relation with the operation of the main coil winding machine, and also constantly rotates the wire strippers 36. The remaining mechanisms are driven intermittently by the motor 52 as determined by the one-revolution clutch 30 when tripped by the pitman 28.

Referring now to Figs. 4 and 5, the details of the one-revolution clutch 30 are shown in an enlarged view, wherein the ratchet wheel 70 has already been referred to as rotating constantly and also the pitman 28 which trips the clutch in timed relation to the other elements of the complete winding machine. The ratchet wheel 70 has twelve teeth, being rotated by shaft 70A suitably mounted in bearings in the housing 54 and driven by the motor 52 through the driving mechanism already described. Mounted behind the ratchet wheel and rotatable on the shaft 70A is a cam plate 74 provided with a lateral projection 76 overhanging the ratchet wheel 70 to which is attached a cam block 78 by screws 80. The cam block 78 is provided with an upwardly extending cam face 82 and also with a forwardly extending cam face 84 (Fig. 4) which cooperate with cam wheels 86 and 88 respectively. The cam wheel 86 is mounted on a pivoted lever 90 movable about stud 92 affixed in the frame about a substantially vertical plane, while cam wheel 88 is mounted on a lever 94 affixed to shaft 96 being movable in a plane normal to that of cam wheel 86 and adapted to rotate the shaft 96 in its journals 98 affixed to the frame (Fig. 1). The cooperation between the cam faces 82 and 84 with cam wheels 86 and 88 provide the means to determine the active and inactive periods of the mechanisms at points D and B on the strands S.

On the lower end of the cam plate 74, a pawl 100 is mounted on stud 102 in a manner whereby the tooth 104 of the pawl may interlock with the teeth of ratchet wheel 70. The pawl is provided at the end opposite from the tooth 104 with an overhanging backward projection 106 to cooperate with a spring 108 seated in a bore 110 in the bottom end of the cam plate 74. The spring 108 resiliently urges the pawl tooth 104 into operative engagement with the ratchet wheel 70, except when the projection 106 contacts block 114 and spring-urged detent 112 mounted in the block 114 affixed to the frame 54 directly below the shaft 70A as is best seen in Fig. 4.

The spring-urged detent 112 is stiff enough to overcome the spring 108 and thereby frees pawl tooth 104 from the constantly rotating ratchet wheel to stop the rotation of the assembly at the point shown in Fig. 4 with both cam rollers 86 and 88 at the high points of their co-operating cam faces 82 and 84, depression 84A being provided to assist in holding the roller 88 in this position.

Rotatively positioned in front of the ratchet wheel 70 on the end of the shaft 70A, an oscillating plate 115 is provided having a flat oblique side 116, on which is pivotally mounted by stud 118, a thrust finger 120 which overhangs the back side of the plate 115 to contact the cam head 78 as is best seen in Fig. 5. The finger 120 is resiliently urged into its overhanging relation by spring 122 which is anchored on plate 124 attached to the front side of the oscillating plate 115 by screws or the like. A stop consisting of a hidden pin 126 mounted on face 116 cooperating with a slot 127 in the finger 120 is provided to limit the overhanging movement. The oscillating plate 115 is pivotally connected to pitman 28 by stud 128 projecting from its front face, so that the plate may be oscillated through a predetermined angle about the shaft 70A by the reciprocation of the pitman 28 by the cam 22 as already described. The angular movement of the oscillating plate 115 pushes the cam assembly in a counter-clockwise direction (Fig. 4), so that projection 106 of the pawl 100 is freed from the detent 112, which allows the pawl tooth 104 to move toward the ratchet wheel 70 as urged by springs 108 and engage the next tooth of the ratchet wheel which is constantly rotating also in a counter-clockwise direction. This engagement locks the two elements together and both will rotate together for approximately one revolution until the projection 106 again engages the detent 112 to free the pawl tooth from its engagement with the ratchet wheel tooth and thereby stop the movement of the cam assembly 74 in the same relative position as before with both cam rollers 86 and 88 again on the high point of their cooperating cams 82 and 84 respectively. In returning to this initial position, the cam head 78 presses the finger 120 forwardly against the spring 122 until it overruns the finger, which then snaps back to the initial position shown in Fig. 5 which will enable it to trigger the next sequential operation under the thrust of pitman 28. In this way, the elements of the wire-stripping device are triggered by the pitman 28 in timed relation to the operation of the machine as a whole.

The pivoted lever 90 with its cam roller 86, cooperating with cam face 82, controls the burning away of the insulation (point B) from the strands S, while the arm 94 affixed to the rotatable shaft 96, with its cam roller 88 cooperating with the cam face 84, controls the scraping of the insulation (point D) from the strands. The burning of the insulation at point B and the scraping of the insulation at point D both occur during the period in which the cam head assembly 74 is making its one revolution as controlled by the triggering device set in motion by pitman 28. The two positions for point B are shown in separated relation in Figs. 12 and 13, while the concurrent positions for point D are shown in Figs. 10 and 11.

Referring now to Figs. 12 and 13, the pivoted arm 90 is pivotally connected to a link 130 whose opposite end is pivotally connected to a crank 132 affixed to shaft 134, pivotally mounted on journals 136 affixed to the frame 54 (Fig. 2). The shaft 134 has affixed to it two arms 138 and 140 which mount the sheaves 40 and 42 respectively, whereby the sheaves which control the strands S may be tilted into an angular relation about the axis of the shaft 134 to bring the strands S strung between the sheaves into the locus of flames issuing from the gas burners 44, already described, which subjects the insulator to a sufficiently high temperature to burn off the insulation at point B. The insulation usually consists of a cotton covering over an enameled wire and so is capable of being burned or charred by the burners 44. The shaft 134 is provided with a laterally projecting arm 142 which cooperates with stops 144 affixed to the frame 54 to limit the angular movement to a predetermined angle, a spring 146 being provided to urge the arm upwardly against the upper stop, which by the linkage described, is transmitted to the roller 86 which is thereby resiliently urged downwardly into cooperative relation with the cam face 82. In this way, the strands S threaded over sheaves 40 and 42 are moved from a remote position shown in Fig. 12 into the locus of the flames of the burners 44 as shown in Fig. 13, while the one-revolution clutch 30 is making its single revolution when triggered by the pitman 28. During this short period of time, the insulation is burned off and charred from both strands S at station "B."

In Figs. 10 and 11, the principal parts of the control for the wire insulation scraping device 36 are shown in isolation. The interaction of the cam face 84 and the cam roller 88 has already been described in connection with the one-revolution clutch 30, whereby the cam roller rotates the shaft 96 in its journals 98 through the agency of the arm 94. This rotative motion of the shaft 96 is transmitted to a pair of affixed arms 148 which extend in the opposite direction from the arm 94, which is thrust downwardly (Fig. 10) to give an upward thrust to the arms 148 against the resilient bias of springs 150. The distal ends of the arms 148 are bifurcated to yoke tubes 152 which extend longitudinally of driving drums 154 of the wire strippers being provided with conical end faces 156 adjacent the ends of the drums. The arms 148 are pivotally connected to the tubes and adapted to move them longitudinally. In this instance, the coils C are made of two strands S and a wire stripper 36 is provided for each strand which, for purposes of briefness, will be described for only one strand, it being understood that the stripper for the other strand is identical. The separate wire strands run through the inside of each tube 152, as is best seen in Fig. 2A and also Figs. 10 and 11.

The details of the pivotal connection between the arm 148 and the reciprocating tube 152 are more clearly set forth in Fig. 7, where the bifurcated portion 148A is provided with slots 158 to engage pintles 160 projecting from the sides of a square nut 162 adjustably threaded on the tube 152 and locked in position by lock nut 164. The tube 152 is mounted inside of stationary bearing tube 166 for reciprocation longitudinally therein by the arm 148. The bearing tube is provided with an external shoulder 168, against which is seated an internal race of a ball bearing 170, cooperating with a sleeve 172 which, in turn, is seated against the side of the frame 54 which is provided with an aperture 174, through which tube 166 extends to the opposite side where it is threaded and provided with a locking nut 176. In this manner, the tube 166 is rigidly held in normal relation to the frame member and providing a seat for the tube 152 longitudinally reciprocable therein and also a journal for driving tube 154 positioned concentrically on the exterior thereof rotatable about a pair of ball bearings 170 and 178 seated on the exterior of tube 166 and fitted into the interior of the driving tube 154. Each end of the driving tube 154 is closed with a flat plate 180 and 182 held in position by any convenient means such as screws or the like to thereby hold the ball bearings 170 and 178 in position. The plate 182 on the right end (Fig. 7) of the driving tube also holds the sprocket 73 in position on the exterior of the tube which is conveniently keyed thereto for a locking and driving relation as has already been described above.

Affixed to the exterior of the bearing tube 166 between the ball bearings 170 and 178 a gear 184 is provided which is, therefore, stationary but adapted to have clearance inside of the driving tube 154 so that it can rotate about the gear on its bearings 170 and 178. The gear 184 meshes with a pinion 186 integrally formed on the end of shaft 188 (Fig. 7) rotatively mounted in spaced ball bearings 190 mounted in an eccentric cylindrical tube 192 whose extension 194, adjacent the pinion 186, is affixed to the perimeter of the driving tube 154 in any convenient manner as by screws or the like. The driving tube 154 is mortised at 196 to form a seat for the extension 194 and is cut away to form an opening 198, through which the pinion 186 engages with the gear 184 as is best seen in Fig. 8. In this way, the tubes 192 and 154 rotate together, with their axes in parallel but spaced relation, so that the pinion 186 may mesh with the perimeter of the stationary gear 184 by revolving in an orbit about the gear and to be rotated thereby at a relatively high speed.

The shaft 188 between its spaced bearings 190 has affixed thereto a pair of helical gears 200, which mesh through apertures 201 in the side of tube 192 with gears 202 affixed to oblique shafts 204 rotatively mounted in ball bearings 206 journaled in hollow oblique housings 208 provided with arms 210 embracing the tube 192 and adapted to be adjustably clamped thereon in fixed relation by screw 212. On the end of the oblique shafts 204, in the direction of the axis of the driving tube 154, through which the strands S are concentrically threaded through reciprocating tubes 152, insulation-scraping wheels 214 are affixed and removably held in position thereon for necessary replacement by nuts 216. The details of these scraping wheels will be further described hereinafter.

The scraping wheels 214 rotate about the axes of shafts 204, and are also rotated bodily in an orbit about the axis of the tube 152 and, therefore, about the longitudinal axis of the strand S. The orbit of the spring scrapers 218, of which eight are supplied, is displaced a slight distance from the wire as is best seen in Fig. 8B when the elements of the machine are in normal aligned position, so that in order to provide a scraping of the burnt insulation from the wire strand, a carriage 220 is provided which is adapted to displace the strand toward the orbit of the rotating scraper blades 218 until contactual relation is established as is shown in Fig. 8C. The carriage 220 consists of a longitudinally disposed angle iron 222 which is attached to angular bosses 224 at its ends forming a part of support rings 226 encircling the tube 192 to provide a rotatable support for the carriage about the axis of the tube. The rings 226, and the angle iron 222 forming the carriage, are held in position on the tube 192 by a pair of lock nuts 228 threaded on the end of the tube.

The angle iron 222 has attached to it adjacent its end a pair of strand guides 230 which are attached to it by any convenient means such as screws 232, the guides having eyes 234 through which the strand S is threaded. Between the guides 230, the angle 222 is provided with a platform 236 having a V-groove 238 cut on its upper surface in which the strand S is adapted to slide after issuing from the first eye 234, so that the upper side of the strand is exposed and capable of being scraped by the cutters 218 when pressed toward them at selected times, the platform providing an anvil to support the strand while being scraped. The platform is attached to the angle in any convenient manner as by screws 240. To further assure holding the strand against displacement from the groove 238, a raised side plate 242 is urged downwardly by a spring 243 within the block 244 which is fixed to the angle 222 by screws 245 at substantially a mid point of the angle 222. A portion of the plate 242 overhangs the wire strand urging it against the V-groove 238 in the platform 236. The upper end of the plate is made triangular shaped to fit more closely between the two wheels 214 as is best seen in Fig. 7.

The mechanism to move the platform 236 and, therefore, the strand S from its normal clear position as shown in Figs. 7, 8A, and 8B, which will obtain while the strand S is moving through the eyes 234 to be wound in the winding form F of the main winding machine to form a coil C, to the scraping position as shown in Fig. 8C, will now be described. This will obtain in the period in which the one-revolution clutch 30 makes its one revolution to clear the roller 88 (Fig. 7) from its cooperating cam face 84, which allows the spring 150 to thrust the arm 148 upwardly which, in turn, moves the tube 152 outwardly to withdraw the cone 156 into the driving drum 154. This action is also shown in Figs. 10 and 11, discussed above. The mechanism which is actuated by the withdrawal of the cone 156 on the tube 152, as is seen best in Fig. 10, causes the strand S to move into the orbit of the rotating blades 218 of the scrapers 214 to subject the already burnt and charred insulation on the strand to the final scraping and cleaning operation just prior to being wound into the winding form F.

Referring to Fig. 7, it will be noted that the inner mounting ring 226 for the angle iron 222 is positioned in spaced parallel relation to end plate 180 of the driving drum 154, and that the cone-shaped end 156 of the tube 152 is adapted to move transversely across the space between these members as it is reciprocated by the arm 148 under control, therefore, of the cam on the one-revolution clutch 30 as already described. The cone 156 is symmetrical with the axis of rotation of the driving drum 154 being concentric therewith and is also symmetrical with the orbit of revolution of the eccentric tube 192 on which are rotatively mounted the scrapers 214, so that, in effect, the cone is a cam face, about which an actuating roller element 246 may rotate and yet maintain a predetermined condition depending on whether the cone 156 is in advanced or retarded position. The roller element 246 is rotatably mounted on the inner face 248 of the mounting ring 226 by a stud 250 and is also given a cone-shaped end face 252 which is adapted to cooperate in its initial phases with the cone 156. The roller 246 is resiliently urged into cooperative relation with the cone 156 by a spring 254 attached to the face 248 of the mounting ring 226 and anchored on a peg 256 affixed to the end plate 180 of the driving drum 154. The bias of spring 254 urges the carriage 220 in a counterclockwise direction against a stop 258 mounted on the plate 180 and cooperating with a peg 260 on the ring 226 (Figs. 8B and 8C), the position of the carriage being controlled, however, by the relation between the roller 246 and the control cone 156 on the tube 152.

When the reciprocating tube 152 places the control cone 156 in advanced or normal position, as shown in Figs. 7, 8A and 8B, the wire strand is clear, but when the cone is withdrawn (Fig. 8C), the spring 254 urges the carriage upwardly, so that the strand S is no longer concentric with the large bore of the tube 152, but is displaced therein and resiliently urged into the orbit of the cutters 218 of the scrapers 214 which move tangentially thereover for the cleaning and scraping operation. This tangential contact will obtain while the one-revolution clutch 30 revolves once. In the meantime, the tube 192 mounting the scrapers will also have revolved in its orbit through one revolution around the axis of the strand, so that its entire outer surface will be subjected to the scraping action of the revolving scrapers 214, which rotate at a relatively high speed on their axes. At the end of the one revolution of the clutch 30, the cam 84 is again active and the scraper parts are returned to normal position shown in Fig. 7. The speed of the one revolution clutch and the scraping mechanism is sufficient to perform the entire scraping step before the winding machine starts to wind another coil.

Turning now to Figs. 9 and 9A, the cutter wheel or scraper 214 is shown which has eight spring blades 218 mounted symmetrically about its perimeter and extending backwardly at an angle of approximately 45 degrees from the direction of rotation. The scraper body consists of a hub 262 and a face plate 264, the latter being provided with a perimetrical flange 266 cut away to form angular stops 268 which have sufficient clearance between them to allow substantial deflection of the blades 218.

The inner ends of the blades are anchored in eight slots 270 cut across the hub 262 approximately 45 degrees apart, each end of the blades cooperating with two intersecting slots, as shown to firmly anchor the spring blades in the hub. Additional resiliency is provided for the blades by causing them to wrap around the hub approximately 180 degrees from anchor slot to stop 268.

The blades 218 are made of hardened material and are cut off square at their ends to provide a cutting edge. The axis of the cutter 214 is set obliquely to the axis of the wire as shown in Fig. 9A. In this manner, the cutting edges contact the strand S tangentially at the leading edge 218A and scrape the wire strand longitudinally all the distance across the cutting edge and leave the wire at the trailing edge 218B. In this way, the wear on the blade ends with the cutting edges is uniform across its face and materially adds to the life of a blade. The blades are easily removed for grinding and resharpening, and are held in place by flange 272 when the wheel is held in position on its shaft 204 by the nut 216. The length of the scraping cut longitudinally of the strand S is controlled by moving the strand in or out from the axis of rotation of the cutter wheel 214.

Referring to Fig. 14, the timed relation of the insulation scraping device is related to the other elements of the machine as disclosed in the aforementioned Caldwell application. It will be noted that the scraping device begins operation at point O, at which time the winding form F has completed the winding portion of the cycle and is stationary, so that the strands S are also stationary as already described.

If desired, a vacuum lint collector can be provided for each strand adjacent sheave 34 as is shown in Fig. 1.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, the combination of means for moving an insulated wire strand along its longitudinal axis at selected times, a supporting means for the strand, a scraping edge cooperating with the supporting means moving in a circular orbit about a rotative axis oblique to the axis of the strand, support means for the scraping edge moving in its circular orbit about its rotative axis, means to rotate the support means and the rotating scraping edge in a second orbit around the longitudinal axis of the strand, means to establish contactual relation between the rotating scraping edge and the strand to scrape the insulation from the strand, and means for operating the last two of said means in timed relation with the first means.

2. In a device of the class described, the combination of means for supporting an insulated wire strand, rotating means cooperating with the supporting means including scraping means moving in a circular orbit tangential of the strand, the axis of the orbit being oblique to the longitudinal axis of the strand, and means for moving the rotating means while in tangential contact with the strand in a circumferential orbit around the axis of the strand.

3. In a device for scraping insulation from a wire strand comprising a multiplicity of flat spring elements having transverse cutting edges, means adapted to mount the elements for rotation on an axis with the cutting edges located substantially in the locus of a cylinder tangential to the wire strand, said axis of rotation being at an oblique angle to the longitudinal axis of the strand, the square cutting edges of the spring elements scraping the strand beginning at one side and continuing to the other to equalize wear, and means for rotating the mounting means about the longitudinal axis of the wire strand to scrape the insulation from all sides of the wire strand.

4. In a device of the class described, the combination of support means, means on the support means for moving an insulated wire strand to be cleansed intermittently in a normal location along its longitudinal axis, means on the support means to move a portion of the strand in a lateral direction from its normal location to a displaced position while said strand is stationary, a burner affixed on the support means to burn the insulation from the strand portion in its laterally displaced position, rotatable scraper means on the support means adapted to tangentially contact another strand portion which has already had its insulation burned off by the burner means to scrape the strand clean while the strand is in its stationary phase, and power means to drive the various moving means of the device in timed relation.

5. In a device of the class described, the combination of support means, means on the support means for moving an insulated wire strand intermittently in a normal location along its longitudinal axis, means on the support means to move a portion of the strand in a lateral direction from its normal location to a displaced position while said strand is stationary, a burner affixed on the support means to burn the insulation from the strand portion in its laterally displaced position, scraper means on the support means rotatable about the strand adapted to tangentially contact another strand portion a fixed distance from the first portion which has already had its insulation burned off by the burner means to scrape the strand clean while the strand is in its stationary phase, and power means to drive the various moving means of the device in timed relation.

6. In a device of the class described, the combination of support means, means on the support means for moving an insulated wire strand intermittently in a normal location along its longitudinal axis, means on the support means to move a portion of the strand while it is stationary from its normal location at which intermittent forward movement occurs to a laterally displaced position, a burner affixed on the support means to burn the insulation from the strand portion in its laterally displaced position, rotatable scraping means on the support means having several scraping edges adapted to contact another strand portion a fixed longitudinal distance from the first portion which has already had its insulation burned from it by the burner, said scraping edges moving in a circular orbit about the strand portion having one axis of rotation oblique to the longitudinal axis of the wire strand to move the scraping edges tangentially of the wire strand, and a second axis of rotation concentric with the wire strand to move the several scraping edges in a second circular orbit around the wire to scrape the strand clean while the strand is in its stationary phase, and power means to drive the various moving means of the device in timed relation whereby portions of the wire first have the insulation burned therefrom by the burner during a stationary phase and then are moved longitudinally by the means for moving the strand to a second position where the already burned portion is subject to the action of the rotatable scraper.

References Cited in the file of this patent

UNITED STATES PATENTS

| | | |
|---|---|---|
| 1,433,320 | Wersel | Oct. 24, 1922 |
| 1,734,745 | Ray | Nov. 5, 1929 |
| 1,800,917 | Weis | Apr. 14, 1931 |

(Other references on following page)

UNITED STATES PATENTS

| | | |
|---|---|---|
| 1,800,950 | Metzger | Apr. 14, 1931 |
| 1,828,413 | Holmes | Oct. 20, 1931 |
| 1,831,115 | Holmes | Nov. 10, 1931 |
| 1,930,219 | Zimber | Oct. 10, 1933 |
| 1,931,061 | Collins | Oct. 17, 1933 |
| 2,109,415 | Deiters | Feb. 22, 1938 |
| 2,307,046 | Johnson | Jan. 5, 1943 |
| 2,571,078 | Vollmer | Oct. 9, 1951 |
| 2,645,796 | Leece | July 21, 1953 |
| 2,671,363 | Wells | Mar. 9, 1954 |